United States Patent [19]

Grosso

[11] 4,347,996
[45] Sep. 7, 1982

[54] SPIN-STABILIZED PROJECTILE AND GUIDANCE SYSTEM THEREFOR

[75] Inventor: Vincent A. Grosso, Hopkinton, Mass.

[73] Assignee: Raytheon Company, Lexington, Mass.

[21] Appl. No.: 152,284

[22] Filed: May 22, 1980

[51] Int. Cl.³ .................................................. F41G 7/26
[52] U.S. Cl. .................................... 244/3.16; 244/3.22
[58] Field of Search .................... 244/3.16, 3.19, 3.15, 244/3.22

[56] References Cited

U.S. PATENT DOCUMENTS

| | | | |
|---|---|---|---|
| 3,843,076 | 10/1974 | King et al. | 244/3.16 |
| 3,905,563 | 9/1975 | Nagoshi | 244/3.15 |
| 4,264,907 | 4/1981 | Durand, Jr. et al. | 244/3.16 |

*Primary Examiner*—Charles T. Jordan
*Attorney, Agent, or Firm*—Philip J. McFarland; Joseph D. Pannone

[57] ABSTRACT

A guidance system is shown whereby a spin-stabilized projectile with a "strap-down" seeker may be commanded to fly toward a target by maintaining an inertial line-of-sight rate below a preset limit. To accomplish the desired mode of guidance the projectile here is equipped with a polarization receiver to establish an inertial reference in roll, a strap-down seeker to determine the existing line-of-sight between the projectile and the target during intercept, a signal processor to convert signals out of the polarization receiver and the strap-down seeker into signals indicative of the time rate of change of the line-of-sight angle, corrected for any gyroscopically induced movement of the projectile, a plurality of thrusters in helical channels about the periphery of the projectile and a controller, responsive to the output of the signal processor, to select and fire selected ones of such thrusters to keep the rate of change of the line-of-sight angle below a preset value.

5 Claims, 9 Drawing Figures

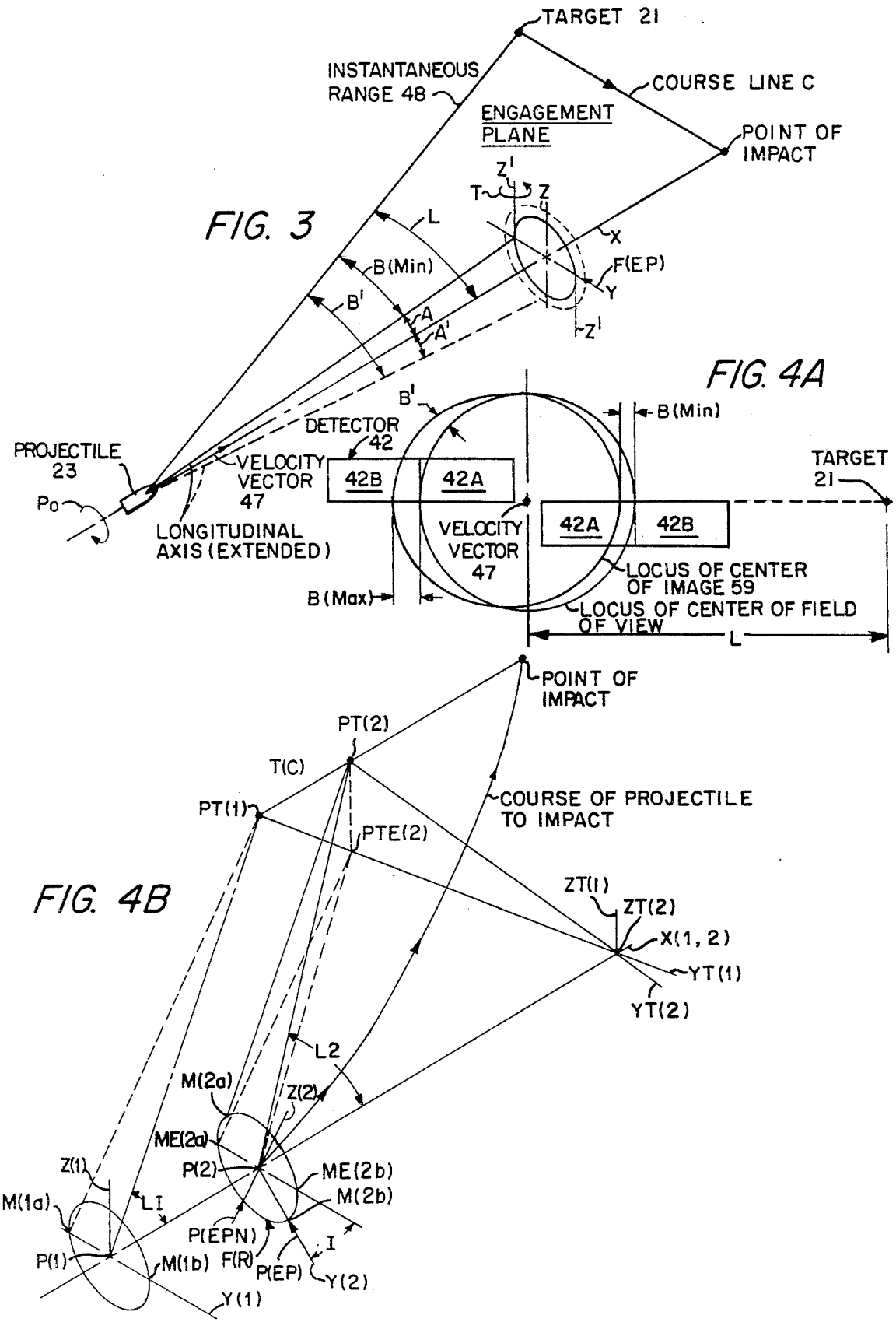

SPIN-STABILIZED PROJECTILE AND GUIDANCE SYSTEM THEREFOR

BACKGROUND OF THE INVENTION

This invention pertains generally to guidance systems and more particularly to a guidance system for artillery-fired projectiles and missiles.

Artillery or gun systems have been and will continue to be a major component of both ground and naval weapon systems. Shipboard gun systems provide for any of the following missions: e limited the effectiveness of such systems in the aforementioned missions. Fire control refinements, such as radar controlled guns, have been developed, but such gun systems still do not provide the desired level of performance, especially with the advent of advanced threats such an anti-ship missiles.

The effectiveness of gun systems may be greatly improved by providing projectiles in flight with a capability to maneuver to home on a target. A capability to maneuver implies the use of a seeker within the projectile. Because such a seeker must be capable of surviving a "high g" environment when fired from a gun, conventional seekers using inertially stabilized platforms and servomechanisms are not practical. Finally, the production costs of any such projectiles must be minimized because of the large number of such projectiles expected to be used in any tactical situation.

SUMMARY OF THE INVENTION

With the foregoing background of the invention in mind, it is a primary object of this invention to provide a guidance system for a gun-launched, spin-stabilized projectile which povides lead guidance for such a projectile in a manner similar to that provided by proportional navigation in a guided missile using inertial instrumentation and conventional control systems.

The primary object and other objects of this invention to be discerned are attained generally by providing, in an artillery system, a spin-stabilized projectile providing an inertial reference in pitch and yaw which may be directed in flight toward a selected target by selectively firing thrusters disposed about the periphery of such projectile and oriented to provide impulsive thrusts orthogonal to the spin axis of such projectile. The firing command for each thruster is generated by a guidance arrangement carried by the spin-stabilized projectile, such guidance arrangement including means for continuously determining the relative position of the selected target and the instant of time when any particular thruster may be fired to correct any error in the flight path of the spin-stabilized projectile toward impact with the selected target.

BRIEF DESCRIPTION OF THE DRAWINGS

The foregoing features of this invention, as well as the invention itself, may be more fully understood from the following detailed description read together with the accompanying drawings, wherein:

FIG. 3 is a sketch showing how an intercept is contemplated to be accomplished in an idealized tactical situation;

FIG. 4A is a sketch showing the manner in which precession of a projectile, as shown in FIG. 1, about its velocity vector causes movement of the image of a target to move in the image plane of the optical assembly of FIG. 2B;

FIG. 4B is a sketch showing how a target in an exemplary tactical situation would move with respect to a projectile and how a force should be applied to change the course of such a projectile to accomplish a successful flight;

DESCRIPTION OF THE PREFERRED EMBODIMENT

Figure 1:
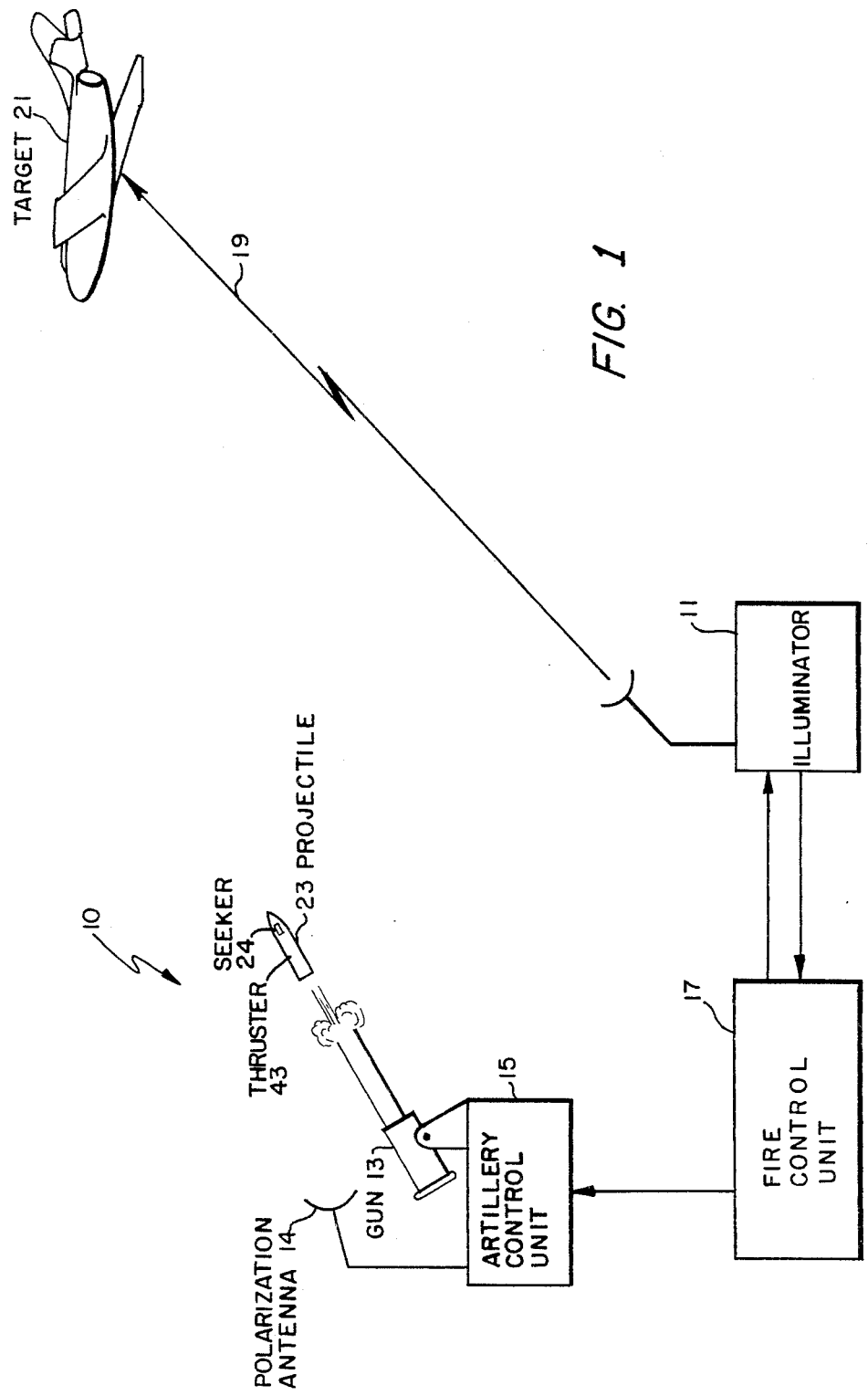
FIG. 1 is a sketch illustrating an exemplary tactical situation showing generally the major components of the contemplated system.

Referring now to FIG. 1, a gun control system 10 of the type contemplated is shown to include means for illuminating a target 21 (here such means being a continuous wave laser illuminator 11), an artillery piece 13 and a control unit 15, all of which elements are controlled by a fire control unit 17. A spin-stabilized projectile 23 (sometimes hereinafter referred to simply as projectile 23) is shown to have been fired from the artillery piece 13 toward a target 21 which is being illuminated by a beam 19 of laser energy from the laser illuminator 11. It will be appreciated that the just-described elements constitute a conventional gun control system whereby the projectile 23 is fired toward a predicted point of impact with the target 21. Obviously, however, maneuvering by the target 21, error in the calculation of the predicted point of impact and ballistic dispersion all reduce the probability of a successful interdiction. To increase the probability that the projectile 23 will actually intercept the target 21, the projectile 23 is fitted with thrusters 43 (discussed in more detail hereinafter) which are controlled by a guidance arrangement 24 (also to be discussed hereinafter). Suffice it to say here that the guidance arrangement 24 (operating in conjunction with a beam of polarized energy from an antenna 14 mounted on the artillery control unit 15) is operative during flight of the projectile 23 to adjust the trajectory thereof to compensate for error from any cause. Thus, the projectile 23 may be directed to impact with the target 21 or at least to a point within a lethal range so that the target 21 is interdicted.

Figure 2A:
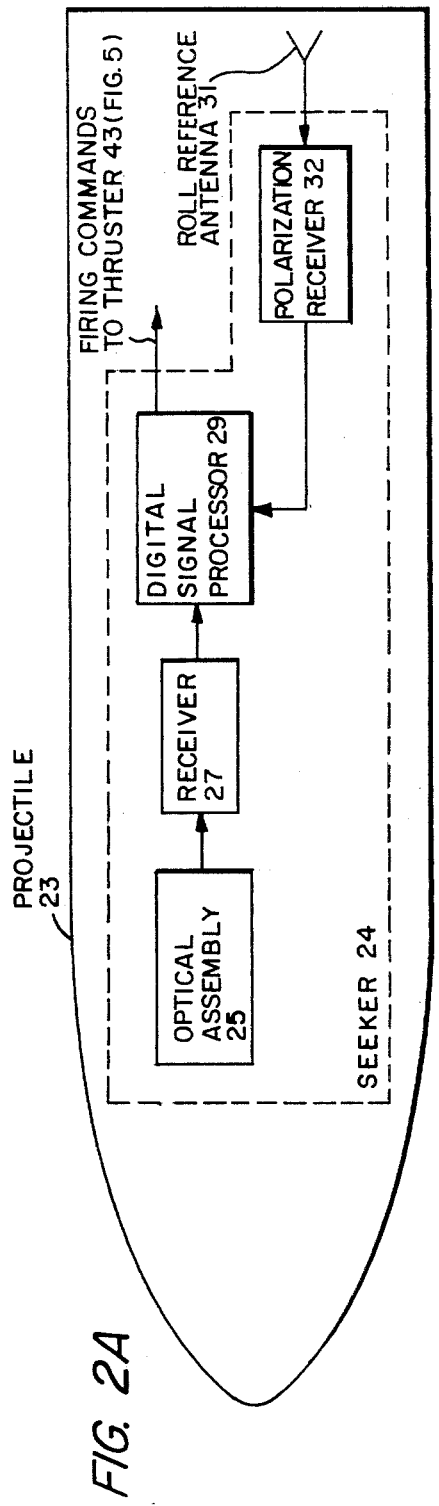
FIG. 2A is a block diagram showing the arrangement of the seeker, here contemplated to be used in a projectile, along with an arrangement for establishing an inertial reference plane.
Figure 2B:
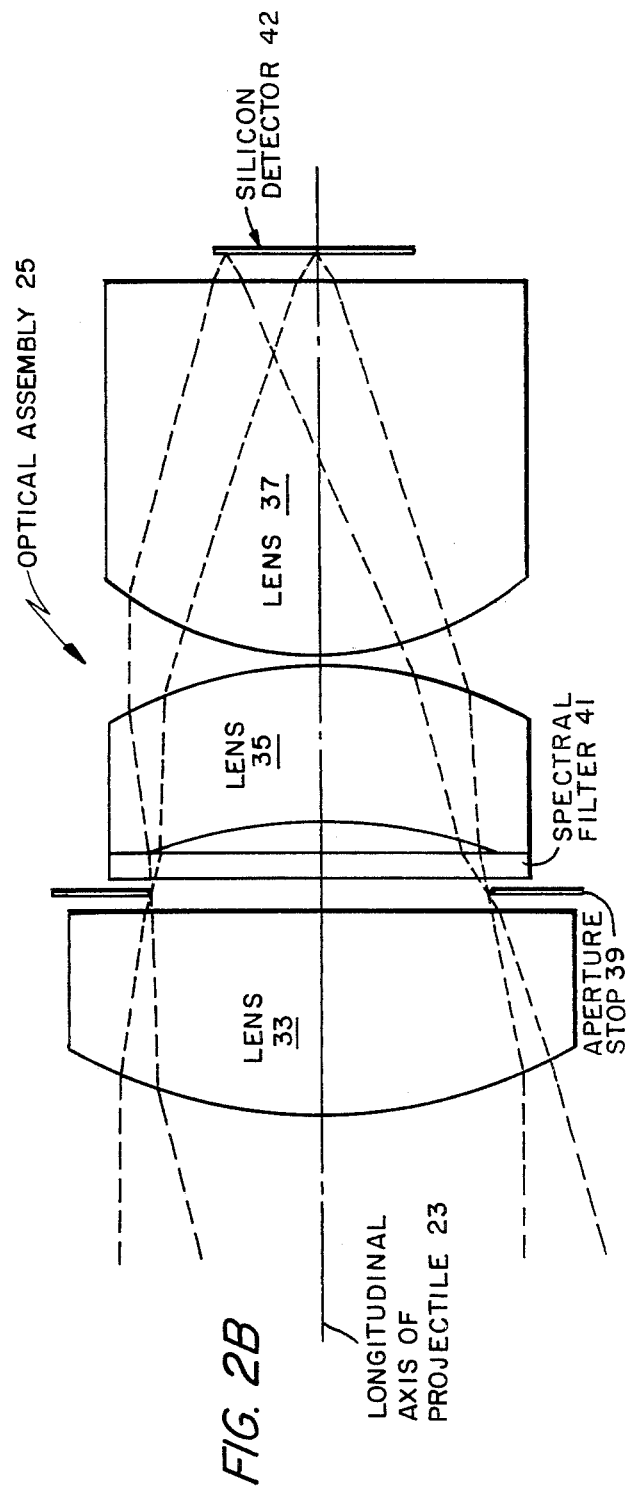
FIG. 2B is a cross-sectional view, somewhat simplified, of the optical assembly intended to be used in the seeker of FIG. 2A.

Referring now to FIGS. 2A and 2B, the guidance arrangement 24 is shown to include an optical assembly 25, a receiver 27, a digital signal processor 29, a roll reference antenna 31 and a polarization receiver 32. Optical assembly 25 here includes lenses 33, 35 and 37, an aperture stop 39, a spectral filter 41 to pass the laser energy and a detector 42, all of which are of conventional design. The optical assembly 25 here has a conical field of view with a half-vertex angle in the order of 15°, such field being centered on the longitudinal axis of the projectile 23. With a field of view of such a size, laser energy reflected from the target 21 is always passed through the optical assembly 25 to fall on the detector 42 as a defocussed spot. The latter, here made up of two silicon detectors 42A, 42B (FIG. 4A), then is actuated to produce a difference signal in accordance with the instantaneous value of the line-of-sight angle (meaning the angle between the longitudinal axis of the projectile 23 and the line-of-sight between the projectile 23 and the target 21). Signals from detector 42 are suitably amplified and processed in receiver 27 before being digitized in an analog-to-digital converter (not shown) and applied to the digital signal processor 29. The roll reference antenna 31, which is here a simple linearly polarized slot antenna, receives signals from antenna 14 (FIG. 1) and passes such signals, via the polarization receiver 32 and an analog-to-digital converter (not shown), to the digital signal processor 29. The antenna 14 is arranged to transmit a beam of linearly polarized energy which illuminates the projectile 23 in flight. Therefore, as the projectile 23 rotates, the amplitude of the signals out of the roll reference antenna 31 varies at twice the rate of rotation of the projectile 23, such signals successively passing through maxima and minima. The digital signal processor 29 operates, in a manner to be described in detail hereinbelow, on the signals provided by the aforementioned receivers finally to derive fire control signals for the thrusters 43 (FIG. 5). Suffice it to say here that, with the maxima out of the roll reference antenna 31 establishing an inertial reference, the angular line-of-sight rate may be continuously determined so that the projectile 23 may be guided to impact with the target 21 using an adaptation (to be described) of well-known "proportional navigation" techniques. Thus, the thrusters 43 (FIG. 5) may be fired as required to reduce the angular line-of-sight rate, thereby maintaining the projectile 23 on a collision course with the target 21 (FIG. 1). In this connection it will be noted here in passing that, in theory at least, the well known "pursuit" mode of guidance could be implemented here. Thus, if the roll reference antenna 31 (and all other associated elements) were eliminated, the line-of-sight between the projectile 23 and the target 21 could be used as a reference to allow guidance commands. Following a "pursuit" mode of guidance then, the thrusters 43 (FIG. 5) would be actuated first to reduce the lead angle L (FIG. 3) to zero and then to maintain that angle at zero until impact. In a practical case, however, extremely high forces are required (especially in the terminal phase of flight) to maneuver the projectile 23 (FIG. 1) following any "pursuit" mode of guidance. Such a requirement cannot be met in the geometrically limited configuration of a projectile with any known thrusters. The mode of guidance here contemplated requires relatively low forces to maneuver the projectile 23 (FIG. 1) and achieves lead guidance similar to proportional navigation. It will be appreciated by those of skill in the art that all proportional guidance mechanizations utilize some sort of gyroscopic attitude reference to inertially stabilize the tracking loops in order to provide an output signal proportional to the inertial angular line-of-sight to the target. A moment's thought here now will make it clear that the gyroscopic nature of a spin-stabilized projectile provides the opportunity to achieve a guidance mechanization with performance competitive to proportional navigation without the need for such inertial instrumentation.

Referring now to FIG. 3, the projectile 23 is shown to be spinning at an angular velocity, designated $P_o$, as the result of the rotation imparted by the rifling in the artillery piece 13 (FIG. 1). The velocity vector 47, measured through the center of gravity, c.g., of the projectile 23 is shown extended to the predicted point of impact (not numbered). The lead angle (angle L) required, if impact is to be achieved, is measured between the line-of-sight between the projectile 23 and the target 21 and the velocity vector 47. The boresight angle B (here shown as being measured in a plane defined by the longitudinal axis of the projectile 23 and the line-of-sight to the target 21) is an instantaneous angle determined continuously during flight. The angle of attack of the projectile 23 with respect to the velocity vector 47 at different instants of time during flight are designated, respectively, as A and A'. For convenience, the plane in which the maximum and minimum boresight B is measured is designated the "engagement plane".

With the foregoing in mind, it will be appreciated that the directional signals out of the detector 42 (FIG. 2B) are indicative of the lead angle L, but the effects of the precessional and nutational movements of the longitudinal axis of the projectile must be eliminated.

It will be appreciated that aerodynamic and gyroscopic forces experienced by a spinning projectile in flight would cause the longitudinal axis of such a projectile to "cone" (meaning to precess around the velocity vector at a rate equal to the "spin" rate) with a substantially constant angle of attack (such as "A"). It will also be appreciated that the projectile 23 here is subjected to aerodynamic forces (varying with velocity, atmospheric density and angle of attack). Such aerodynamic forces (which ordinarily are not applied through the center of gravity of the projectile 23) cause the longitudinal axis of the projectile 23 to precess and, additionally, to nutate about the velocity vector 47. The frequencies at which precession and nutation due to aerodynamic forces occur are lower than the spin frequency of the projectile 23, being representable by two different frequencies, each lower than such spin frequency for a statically unstable configuration. The amplitudes of the precessional circle and the nutational perturbations depend upon conditions experienced by the projectile 23; however, it is manifest that the projectile 23 must remain dynamically stable during flight. The effect, then, is that the angle of attack changes during the flight of the projectile 23 (as shown, for example, by the dashed line (not numbered) and the dashed circle (not numbered) in FIG. 3).

Referring now to FIG. 4A, it may be seen that the motion of the centerline of the projectile 23 causes a corresponding motion of the optical assembly 25 (FIGS. 2A and 2B) about the velocity vector 47 during the period of a single rotation of the projectile 23 (FIG. 1) to change the position of the image of a target on the image plane. To put it another way, the locus of the image 59 of a target 21 continuously changes with respect to the locus of the center of the field of view depending upon the position of the target 21 and of the angle of attack of the projectile 23 during the rotational period being considered. As a result, then, the boresight angle B' similarly changes. Further, it will be noted that the lead angle component of the inertial line-of-sight angle is alternately a maximum and a minimum when the image of the target 21 is in the engagement plane (EP). It will be observed that the image of the target 21 lies in the engagement plane (EP) twice during each period of rotation of the projectile 23. It will also be observed that, because the center of the field of view "cones" about the velocity vector 47 at the spin rate, the detectors 42A, 42B (FIG. 2B) maintain an invariant orientation relative to the velocity vector 47. Thus, the relative amounts of the energy in the defocused image of the target 21 on the detectors varies with the instantaneous magnitude of the boresight angle projected on the image plane (FIG. 3). It will be appreciated that with the output pulse of one of the detectors (here detector 42A) opposite in polarity to the other the sense of the direction of the target 21 (i.e. whether "left" or "right") also may be determined. Additionally, it will be appreciated that one-half the difference of the signals out of the detectors 42A and 42B is a measure of the lead angle L (FIG. 3) modulated by precessional and nutational motion due to aerodynamic forces acting on the projectile 23 (FIG. 1).

The methods and apparatus used within the digital signal processor 29 (FIG. 2A) to determine the lead angle L using the output signals from the detectors 42A and 42B are well known in the art which need not here be recounted in detail. Suffice it to say that the digital peak detection and finite differencing techniques are used. Thus the output signals from the detectors 42A and 42B (after being passed through a first peak detector receiver 27 (FIG. 2A)) are averaged over many successive measurements to obtain signals which vary in accordance with the precessional and nutational periods due to aerodynamic forces. It will be evident to one of skill in the art that the outputs of the detectors 42A and 42B may then be compensated for all movements of the projectile due to gyroscopic motion so that an accurate measurement of the lead angle L (FIG. 3) may be obtained. Further, an accurate measurement of the first derivative of the lead angle L (sometimes referred to as dL/dt) may be obtained by differencing techniques over a period of time.

Figure 4C:
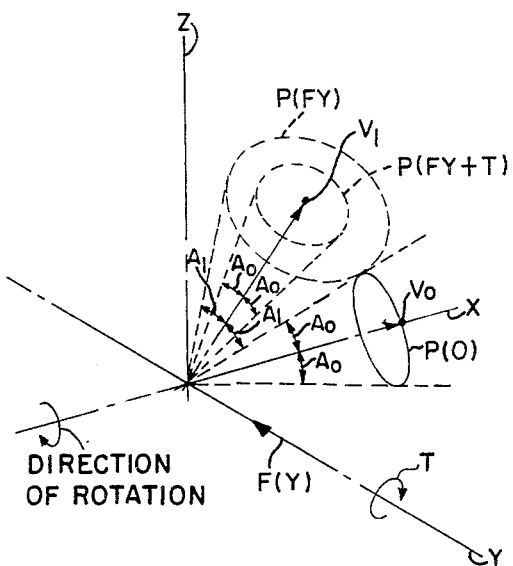
FIG. 4C is a sketch showing, with a projectile as a spinning gyroscopic body, how the axis of rotation of such a projectile may be changed by impulsive forces.
Figure 5:
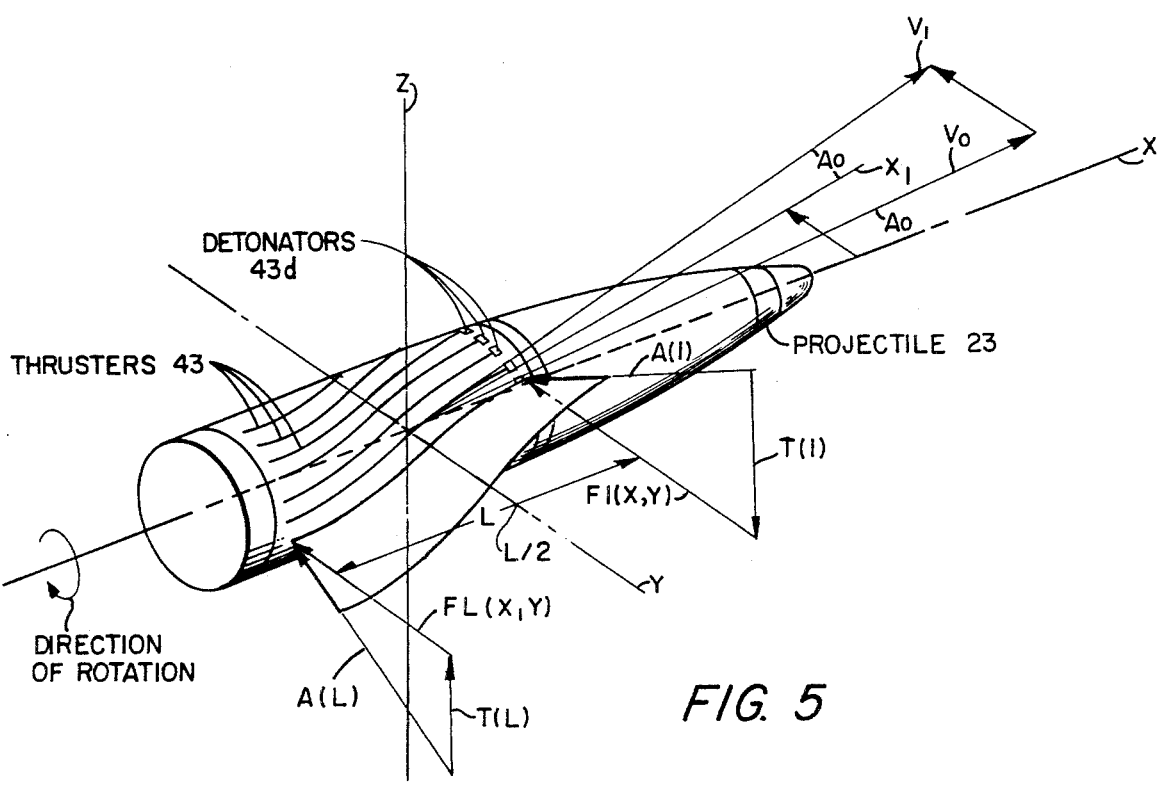
FIG. 5 is a sketch, somewhat simplified, showing the contemplated arrangement by which impulsive forces may be applied to a projectile.

Referring now to FIGS. 4B and 4C, it may be seen that the relatively simple case illustrated and explained in FIGS. 3 and 4A is not ordinarily experienced in practice. That is to say, the course line of a target usually does not initially lie in the engagement plane. Thus, as shown in FIG. 4B, the positions (here designated P(1) and P(2)) of a projectile as shown to be moving along axis X(1,2). Axis YT(1) is orthogonal to axis X(1,2) and passes through the target PT(1). Axis Y(1) is parallel to axis YT(1). Axes ZT(1) and Z(1) are orthogonal to the plane defined by axes YT(1) and Y(1). When the projectile 23 (FIG. 1) is at P(1) and the target 21 (FIG. 1) is at PT(1), the plane defined by axes YT(1) and Y(1) is the then existing engagement plane. The maximum and minimum values of the boresight angle B occur at M(1a) and M(1b). If then the target were to move along the axis YT(1) to a point PTE(2) while the projectile moves to P(2), the engagement plane would remain in the plane defined by the axes YT(1) and Y(1). A different situation obtains when, as here, the target moves to point PT(2) (which point is not on the axis YT(1)) while the projectile 23 (FIG. 1) moves from P(1) to P(2) so that the maximum and minimum values of the inertial line-of-sight angles occur at points M(2a) and M(2b), rather than at points ME(2a) and ME(2b). In effect, then, the axes Z(2), ZT(2), Y(2) and YT(2) may be considered to have been rotated around the X(1,2) axis by an amount equal to the angle I. The engagement plane then corresponds with the plane defined by axes Y(2) and YT(2).

If it be assumed, for ease of explanation, that axes Y(1) and YT(1) are aligned with the direction of polarization of the radio frequency energy from the roll reference antenna 14 (FIG. 1), the signals out of the rear reference antenna 31 (FIG. 2A) and the polarization receiver 32 are maximum when the maximum and minimum inertial line-of-sight angles are measured and the projectile 23 (FIG. 1) is at point P(1). That is to say, the plane defined by axes Y(1) and X(1,2) is the inertial reference plane. Assuming that the spin rate of the projectile 23 (FIG. 1) is substantially constant during each successive period of rotation of the projectile 23 (FIG. 1) about its longitudinal axis, the time between successive maxima out of the polarization receiver 32 (FIG. 2A) may be considered to be the time taken for rotation of such projectile through 180°. The ratio between the difference in time between the occurrence of a maximum signal out of the polarization receiver 32 (FIG. 2A) and the occurrence of a signal out of detector 42A (FIG. 4A) to the time between successive maxima out of the polarization receiver 32 may then be taken as a measurement of the magnitude of the angle I. The direction of the angle I, as measured from axis Y(1), is determined by determining whether a maximum or minimum value of the boresight angle B is measured. The first derivative of the angle I then may be derived in any conventional way to determine the rate of rotation, dI/dt, of the engagement plane. It will be observed that movement of the target along its course line T(C) and the range between the projectile and target are both factors contributing to the rotation of the engagement plane as the target moves from PT(1) to PT(2). This means that: (a) the proper lead angle to effect impact does not lie in the engagement plane existing when the projectile is at point P(2); and (b) the trajectory of the projectile should be changed to compensate for the rotation of the engagement plane.

Digressing for a moment, it will be obvious to one of skill in the art that, in theory at least, a "pursuit" mode of guidance could be adopted here. That is to say, if forces were applied during flight to maneuver the projectile in successively existing engagement planes, the "rotation of the engagement plane" could be ignored and the equipment needed to establish an inertial roll reference plane could be eliminated. However, there are practical considerations which make it here impractical to adopt a "pursuit" mode of guidance. Thus, as is well known, extremely violent maneuvers may be required in the terminal phase of flight using a "pursuit" mode of guidance. The requisite forces to achieve such maneuvers cannot be generated on, or for that matter properly applied to, a spinning projectile in flight sufficient to achieve small miss distance so a "pursuit" mode of guidance cannot here be followed in practice.

Referring now back to FIGS. 4B and 4C, it will be remembered that the projectile 23 (FIG. 1) is a spinning body which acts as a gyroscope with a known gyroscopic inertia. Therefore, (referring particularly to FIG. 4C), an impulsive force F(Y) acting through the center of gravity, c.g., along the Y axis would cause a rotation of the velocity vector around the Z axis. That is to say, the velocity vector, $V_o$, existing just before application of the impulsive force F(Y) would rotate to the position marked "$V_i$". The angular momentum of the spinning projectile would not be changed significantly by the impulsive force F(Y). Therefore, the spinning projectile would, absent any other forces, precess about the velocity vector $V_i$ at an increased angle of attack $A_i$ rather than the initial angle $A_o$. It will be obvious that any appreciable increase in the angle of attack could cause instability and should be avoided. To maintain the angle of attack a torque T applied as indicated around the Y axis is required. The magnitude of this torque should be such that the magnitude of the angular momentum of the spinning projectile is substantially the same before and after application of the impulsive force F(Y) but its direction has been changed in the desired manner.

Referring now to FIG 5, it may be seen that the illustrated arrangement of thrusters 43 results in generation of a reaction force upon firing each thruster, each such reaction force operating effectively: (a) through the center of gravity of the projectile 23 to provide an impulsive force corresponding to the impulse force F(Y) in FIG. 4C; and (b) a torque about the Y axis through the center of gravity of the projectile 23. It will be appreciated that, unless the impulsive force of each thruster effectively operates through the center of gravity, undesirable torques will be applied to the projectile 23. Such torques, at the very least, cause unwanted movement (in pitch or yaw) of the projectile 23 and, at the very worst, may cause the projectile 23 to become unstable and fail to follow its ballistic trajectory. The thruster now to be described causes the effects of all undesirable torques to be eliminated and, at the same time, allows a relatively large impulsive force FIG. 5 it may be seen that each one of the thrusters 43 ing up to, say 60 is made by filling a helical groove (not numbered) with an explosive which may be fired by a detonator 43d here shown disposed at the forward end of the explosive. Each detonator, in turn, is controlled by a firing command from the digital signal processor 29 (FIG. 2A). When a detonator 43d is actuated, the explosive is progressively consumed, starting from the detonator 43d and ending at the far end of the helical groove. The arrows A(1) and A(L) indicate the directions, at the beginning and ending of the firing of a thruster 43, of the instantaneous thrust (or force) from the explosive. The dimension "L" is the length, measured in the X-Y plane of the thruster 43 being considered, with such length being bisected by the Y axis at the point marked L/2. The instantaneous thrust from the burning gases at the beginning and end (marked A(1) and A(L)) are here resolved into components in the X-Y plane marked F1(X,Y) and FL(X,Y)) and components orthogonal to the X-Y plane marked T(1) and T(L)). It will be appreciated that, because of the pitch of the grooves in which the explosive is disposed and the spin of the projectile 23, the magnitudes of the components (and the sense of the components orthogonal to the X-Y plane) change as the explosive is consumed. Thus, when one-half of the explosive is consumed, the direction of the burning gases is along the Y axis; it follows that the component of the instantaneous thrust in the X-Y plane is then coplanar with the direction of the burning gases at L/2 and there is no component orthogonal to such plane. It will now be observed that the effective forces and torques resulting from the complete consumption of the explosive in the thruster being discussed may be expressed as follows:

Effective torque about Z axis = Eq. (1)

-continued
$$\sum_{1 \text{ TO } L/2} F(X,Y) - \sum_{L/2 \text{ TO } L} F(X,Y) = 0$$

Effective torque about Y axis = $\sum_{1 \text{ TO } L/2} T + \sum_{L/2 \text{ TO } L} T$  Eq. (2)

Effective force parallel to Y axis = $\sum_{1 \text{ TO } L} F(X,Y)$  Eq. (3)

The foregoing equations show that complete consumption of the explosives results in an effective force being applied in the X-Y plane parallel to the Y axis and an effective torque being applied about the Y axis. The effective force parallel to the Y axis (which is the same as an impulsive force applied along the Y axis through the center of gravity of the projectile 23) causes the velocity vector of the projectile to be changed, as from $V_0$ to $V_1$, without any significant change in direction of the axis of rotation of the projectile 23. Without more, then, the projectile 23 would "cone" about the new velocity vector $V_1$ with a new, and larger, angle of attack. Such a situation is not desirable because the projectile 23 could then become unstable, meaning that it could fall out of its ballistic trajectory.

The effective torque around the Y axis compensates for any unwanted increase in the angle of attack. Thus, the effective torque around the Y axis causes the axis of rotation of the projectile 23 to precess about the Z axis. In consequence, with an appropriate lead angle of the grooves for thruster 43, the projectile 23 will be caused to precess in a manner to maintain the angle of attack of the projectile 23 constant before and after operation of the thruster 43. It should also be noted that, because the explosive is rapidly consumed, momentary imbalances in the effective force and torque occurring during consumption are of no significance.

It will be evident to one of skill in the art that there are many considerations which dictate the size, disposition and lead angle of the helical grooves. Thus, it is manifest that the dimensions of the helical grooves dictate how much explosive may be placed in each such groove and, together with the type of explosive used, dictate the time taken for consumption. On the other hand, it wil be evident that, because the effective (or resultant) reaction forces created by each firing should approximate an impulsive force, the time taken for complete detonation should be insignificant as compared to the period of rotation of the projectile 23. Therefore, it is here contemplated (with the spin rate of the projectile 23 being in the order of 700 revolutions per second) that the time taken for complete detonation of the explosive in any thruster be approximately 15 microseconds. With such parameters, an error of no more than ±2 degrees in the direction of application of the force F(R) (FIG. 4B) will be suffered. It will also be evident that there is an optimal rate at which individual thrusters 43 should be fired. Specifically, it will be remembered that the projectile 23 is subjected to aerodynamic moments which cause "low frequency" precessional and nutational movements about the velocity vector. By "low frequency," a frequency very much lower than the spin frequency of the projectile 23 is meant. The frequencies at which the precessional and nutational frequencies occur may, for any given type of projectile, be calculated using known techniques. For example, a five-inch projectile rotating at about 600 radians per second would experience "low frequency" nutation at a frequency of about 50 radians per second and "low frequency" precession at a frequency of about 10 radians per second. The "low frequency" precessional and nutational movements appear as two low frequency modulations of the aspect angle. Such variation, therefore, must be compensated in a similar manner as described hereinbefore in connection with FIG. 3.

With the foregoing in mind, it will be appreciated that the signal out of the receiver 27 (FIG. 2A) has three components: (a) a high frequency signal at about 600 radians per second; (b) a first "low frequency" signal at about 50 radians per second; and (c) a second "low frequency" signal at about 10 radians per second. The effect of the high frequency signal may be eliminated by taking one-half of the difference of successive pairs of maximum and minimum signals at 600 radians per second. The effect of the "low frequency" nutational signal may be eliminated by forming a running average of the signal with the signal delayed half a nutational period.

The effect of the second "low frequency" signal, i.e. the modulation of the boresight angle B by "low frequency" precession may be eliminated in the same way as the effect of the higher frequency nutation, with the signal delayed one-half a precessional period before the average is taken.

Figure 6:
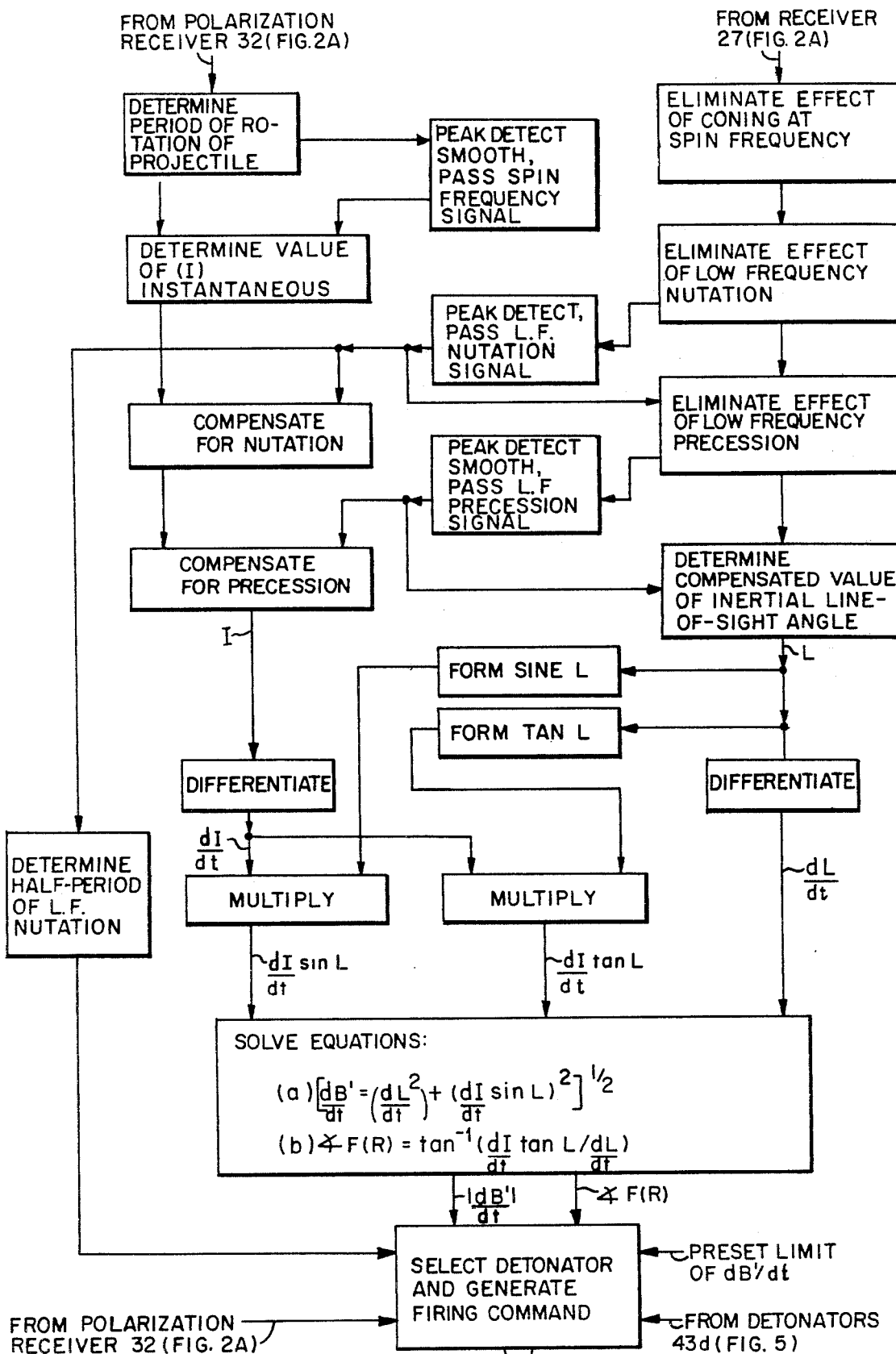
FIG. 6 is a flow chart, somewhat simplified, showing how signals received in the arrangement shown in FIG. 2A may be processed to derive firing command signals for thrusters making up the arrangement shown in FIG. 5.

Referring now to FIG. 6, a flow chart is shown, illustrating generally how the signals from the polarization receiver 32 (FIG. 2A) and the receiver 27 (FIG. 2A) are processed. It will be recognized that the flow chart is somewhat simplified, for example by elimination of conventional converters and clock generators.

With the foregoing in mind, it may be seen that the processing is intended to: (a) determine the angle (I) between an inertial reference plane and the instantaneous engagement plane during flight to allow determination of the time rate of change of that angle (dI/dt); (b) compensate the measured boresight angle (B) and of the angle I for the effects of precession and nutation to derive corrected values for the lead angle (L) and the time rate of change of the angle L, i.e. (dL/dt) and the time rate of change of the angle I, i.e. (dI/dt); (c) utilizing the "angle rates" dI/dt and dL/dt, determine the direction of the impulsive forces to be generated by the thrusters 43 to bound both dI/dt and dL/dt; and (d) finally provide a thruster selection and firing command to accomplish the desired bounding of dI/dt and dL/dt. Successive ones of such thruster selection and firing commands preferably are applied at intervals equal to one-half the period of nutation of the projectile 43 to reduce nutation disturbance to a minimum. It is noted here, however, that such a limitation on the rate at which thrusters are fired is not essential as long as the control frequency is higher than the nutational frequency.

As noted hereinbefore, the angle L and the angle I are, respectively, in the engagement plane and in a plane orthogonal to the engagement plane. The angle B is in the engagement plane when the longitudinal axis of the projectile 23 (FIG. 3) moves into coincidence with that plane.

It will now be evident that:

$$L = B' \pm A, \quad \text{Eq. (4)}$$

when the angle B is measured in the engagement plane (see FIG. 3); and $$I = 180°(T(R) - T(B'))/T(R) \quad \text{Eq. (5)}$$

where T(R) is the time between successive maxima out of the polarization receiver 32 (FIG. 2A) and T(B') is the time of occurrence of an intervening maximum out of the receiver 27 (FIG. 2A). Further, it may be shown that:

$$|dB'/dt| = [(dL/dt)^2 + ((dI/dt) \sin L)^2]^{1/2}, \quad \text{Eq. (6)}$$

and $$\sphericalangle F(R) = \tan^{-1}((dI/dt) \tan L)/(dL/dt) \quad \text{Eq. (7)}$$

The flow chart shown in FIG. 6 illustrates a way of solving Eqs. (1)-(4). Thus, to solve Eq. (1), the signal out of the receiver 27 (FIG. 2A) is processed to remove the modulating signals caused by the gyroscopic motions (precession and nutation) to find the lead angle L. Similarly, the interval between successive maxima out of the receiver 27 (FIG. 2A) and the polarization receiver 32 (FIG. 2A) is measured to determine the value of the angle I compensated for variations due to precession and nutation of the projectile 23 (FIG. 1) in flight. The corrected values of I and L are differentiated to determine, respectively, dI/dt and dL/dt. Additionally, the value of L is used to form the trigonometric functions "sin L" and "tan L" which are multiplied by dI/dt to form the products (dI/dt) sin L and (dI/dt) tan L. The just mentioned products (along with dL) are the bases for the independent variables in Eq. (3) and Eq. (4). Any conventional microprocessor (here a type 2903 microprocessor by Advanced MicroDevices, Inc., Sunnyvale, Calif. 94086) may be used to solve Eq. (3) and Eq. (4). The quantities |dB'/dt| and ∢ F(R) are representative of, respectively, the magnitude of the rate of change of the inertial line-of-sight and the direction, measured from the inertial reference line (axis Y, FIG. 4C), in which a force should be applied to reduce such rate of change. The quantity |dB'/dt| is compared with a preset limit of dB' to provide a logic signal indicative of whether or not the magnitude of the preset limit of dB' has been exceeded. If not, no firing command may be transmitted to any detonator 43d (FIG. 5). If the preset limit has been exceeded, a first enabling signal is generated to allow one of the thrusters 43 (FIG. 5) to be fired when in the rotational position designated by ∢ F(R). The particular thruster fired is determined by conventional logic circuitry (not shown) controlled by the F(R) quantity, the output of the polarization receiver 32 (FIG. 2A) and a "fired" or "not fired" signal from each one of the detonators 43d.

Having described an embodiment of this invention, it will be apparent to one of skill in the art that many changes may be made without departing from the inventive concepts of using a strap-down seeker with signals processed in a manner to provide a guidance mode wherein course changes required of a spinning projectile in flight are effected only when the line-of-sight rate exceeds a preset limit and, when effected, course changes are made in such a manner that the angular momentum of the spinning projectile is substantially the same as before any such change was effected except for the desired change in direction. It is felt, therefore, that this invention should not be restricted to its disclosed embodiment, but rather should be limited only by the spirit and scope of the appended claims.

What is claimed is:

1. A guidance system for a spinning projectile, such projectile being in flight toward a target in motion, such system comprising:
   (a) ground-based means for illuminating the spinning projectile with a linearly polarized radio frequency signal;
   (b) radio frequency signal receiving means including a linearly polarized antenna affixed to, and rotating with, the spinning projectile for establishing a roll reference when the linearly polarized antenna is aligned with the linearly polarized radio frequency signal;
   (c) a seeker for continuously measuring the line-of-sight angle between the centerline of the spinning projectile and the line-of-sight to the target, such seeker having its boresight aligned with such centerline;
   (d) signal processing means, responsive to the outputs of the radio frequency signal receiving means and the seeker, for determining, in a first plane defined by the velocity vector of the spinning projectile and a line from the center of gravity of such projectile to the target and in a second plane orthogonal to the first plane, the rates of change of the line-of-sight between such projectile and target; and
   (e) course correction means carried on the spinning projectile to maintain the vector sum of the rates of change of the line-of-sight in the first and the second plane below a preset value during intercept.

2. A guidance system for a spinning projectile as in claim 1 wherein the course correction means comprises:
   (a) a plurality of thrusters supported in helical grooves formed on the periphery of the spinning projectile, the center of each such thruster being on a circle centered on the center of gravity of the spinning projectile and the pitch of each such groove being opposite to the direction of spin of the spinning projectile; and
   (b) controller means, responsive to the output of the signal processing meanes, for detonating selected ones of the thrusters to change the course of the spinning projectile as required and to maintain the angular orientation of such projectile about the velocity vector of a substantially constant value.

3. The guidance system as in claim 2 wherein the controller means includes, additionally, means for controlling the rate at which selected thrusters are detonated.

4. In a guidance system for a spinning projectile having its velocity vector following a ballistic trajectory to an anticipated point of impact with a moving target, a strap-down seeker comprising:
   (a) optical sensor means affixed to, and aligned with the longitudinal axis of, the spinning projectile, such sensor means being adapted to measure the instantaneous line-of-sight angle between such longitudinal axis and target;
   (b) signal processing means operative:
      (i) firstly to measure the period of rotation of the spinning projectile and then to determine the average value of the instantaneous line-of-sight during each successive one of such periods;
      (ii) secondly to determine, over successive predetermined intervals during flight, the frequencies at which the instantaneous line-of-sight may vary by reason of nutation and precession, at lower frequencies than the frequency of rotation of the spinning projectile, and
      (iii) thirdly, in response to the average value of the instantaneous line-of-sight and the frequencies at which such line-of-sight may vary, to determine the angle between the velocity vector of the spinning projectile and the line between the center of gravity of such projectile and the target.

5. A strap-down seeker as in claim 4 having additional means in the signal processing means for calculating, after successive intervals during flight, the magnitude of the rate of change of the angle between the velocity vector of the spinning projectile and the line between the center of gravity of such projectile and the target and the direction, measured in a plane substantially orthogonal to the velocity vector of such rate of change.

* * * * *

UNITED STATES PATENT OFFICE
CERTIFICATE OF CORRECTION

Patent No. 4,347,996                    Dated September 7, 1982

Inventor(s) Vincent A. Grosso

It is certified that error appears in the above-identified patent and that said Letters Patent are hereby corrected as shown below:

Column 1, line 12, delete "e";

Column 1, line 12, after "missions" insert

-- (a) self-defense against enemy aircraft and anti-ship missiles; (b) shore bombardment against fixed and moving enemy ground targets; and (c) surface engagements against enemy shipping. Unfortunately, the low hit probabilities of gun systems have --

Column 11, line 40, change "meanes" to -- means --.

Signed and Sealed this

Third Day of May 1983

[SEAL]

Attest:

Attesting Officer

GERALD J. MOSSINGHOFF
Commissioner of Patents and Trademarks